(12) United States Patent
Enquist

(10) Patent No.: US 10,309,859 B2
(45) Date of Patent: Jun. 4, 2019

(54) CARPET PROBE FOR LEAK DETECTION

(71) Applicant: INFICON GmbH, Bad Ragaz (CH)

(72) Inventor: Fredrick Enquist, Linkoping (SE)

(73) Assignee: INFICON GmbH, Bad Ragaz (CH)

( * ) Notice: Subject to any disclaimer, the term of this patent is extended or adjusted under 35 U.S.C. 154(b) by 184 days.

(21) Appl. No.: 15/512,268

(22) PCT Filed: Sep. 15, 2015

(86) PCT No.: PCT/EP2015/071034
§ 371 (c)(1),
(2) Date: Mar. 17, 2017

(87) PCT Pub. No.: WO2016/046018
PCT Pub. Date: Mar. 31, 2016

(65) Prior Publication Data
US 2017/0276565 A1 Sep. 28, 2017

(30) Foreign Application Priority Data
Sep. 25, 2014 (EP) .................................... 14186467

(51) Int. Cl.
*G01M 3/04* (2006.01)
*G01M 3/22* (2006.01)
(52) U.S. Cl.
CPC ................ *G01M 3/04* (2013.01); *G01M 3/22* (2013.01)

(58) Field of Classification Search
CPC ...... G01M 3/04; G01M 3/22; G01N 33/0009; G01N 33/0027; G01N 33/004
See application file for complete search history.

(56) References Cited

U.S. PATENT DOCUMENTS

| | | | | |
|---|---|---|---|---|
| 2,974,276 | A * | 3/1961 | Davis ..................... | G01N 17/02 |
| | | | | 324/348 |
| 4,797,618 | A | 1/1989 | De Vries | |
| 5,740,882 | A * | 4/1998 | Griffith ................. | A01M 31/02 |
| | | | | 182/116 |
| 6,532,801 | B1 * | 3/2003 | Shan ...................... | G01M 3/22 |
| | | | | 73/170.04 |
| 7,536,805 | B1 | 5/2009 | Tang | |

OTHER PUBLICATIONS

Edenbros, LLC, "Variotec 460.". http://www.edenbros.com/Products/prodVT460.htm, 3 pages, downloaded from the intranet Apr. 11, 2014.

\* cited by examiner

*Primary Examiner* — Daniel S Larkin
*Assistant Examiner* — Anthony W Megna Fuentes
(74) *Attorney, Agent, or Firm* — The Webb Law Firm

(57) ABSTRACT

A carpet probe for detecting leaks in underground gas pipes, including a handle (12), a wheel (16) connected to the handle (12), and a flat carpet element (14) connected to the wheel (16) and including a sniffing inlet (28) connected to a gas sensor (18), is characterized in that the wheel (16) is the only wheel (16) of the carpet probe adapted for rolling on a ground surface.

18 Claims, 4 Drawing Sheets

CARPET PROBE FOR LEAK DETECTION

CROSS-REFERENCE TO RELATED APPLICATIONS

This application is the United States national phase of International Application No. PCT/EP2015/071034 filed Sep. 15, 2015, and claims priority to European Patent Application No. 14186467.8 filed Sep. 25, 2014, the disclosures of which are hereby incorporated in their entirety by reference.

BACKGROUND OF THE INVENTION

Field of the Invention

The invention refers to a carpet probe for detecting gas leaks in underground gas pipes.

Description of Related Art

The carpet probe is a flat, mostly flexible carpet-like element comprising a gas inlet which is connected to a gas sensor. The carpet element is attached to wheels and freely rotatable with regard to the wheels. The wheels are connected to a handle for pulling or pushing the probe along a ground surface below which a gas leak is assumed. The wheels roll on the ground surface and can be pulled or pushed. The carpet element thereby slides along the ground surface and possible gas escaping from an underground leak accumulates between the ground surface and the carpet and will enter the gas inlet. The gas inlet is typically a tapered opening in the centre of the carpet, the opening being connected to the gas sensor such that gas entering through the gas inlet will be detected by the sensor. The most important feature for collecting the highest amount of the gas escaping from the ground surface is ability of the carpet to stay as close as possible to the ground and be conformant to the ground. A gap between the carpet and the ground will allow wind and turbulence to blow away the gas before it is collected into the inlet. The bigger the gap the more gas is lost this way.

The multi-wheel configuration of known carpet probes limits their mobility, particularly on uneven terrain where the carpet probe needs to be lifted up from the ground surface for relocation. Upon lifting the carpet probe, the carpet will hang down from the wheels and handle because it is freely rotatable with regard to the wheels and handle. This is necessary in order to be able to either push or pull the carpet probe along the ground surface. Pushing the probe requires a different angle between the handle and the carpet element than pulling the carpet probe.

SUMMARY OF THE INVENTION

The aim of the invention is to provide a highly manoeuvrable carpet probe for leak detection with the best possible gas collection ability.

Accordingly, the carpet probe comprises a single wheel only rather than multiple wheels. Due to the single wheel configuration, moving and turning of the probe can be achieved easily by respective movement or turning of the handle. Turning the handle and, thus, turning the probe during operation can be achieved by mere wrist movement. A small turning radius of the probe can thereby be achieved. Moreover, the single wheel configuration makes it possible to run the gas inlet of the probe directly on top of a curb stone. With conventional multi-wheel designs, this was not possible because one wheel would run on the street while the other wheel would run on the sidewalk resulting in sliding engagement between the carpet element and the curb stone.

The single wheel of the probe preferably comprises an axle which sticks out a sufficient amount on either side of the wheel such that the handle and/or the carpet element can be attached to the axle on either or both sides of the wheel. The handle may be attached to the axle via a fork which is rotatably connected to the axle on one or both sides of the wheel. The carpet element may be connected to the axle via a bow element, preferably made of metal or a similar sufficiently stiff material. The bow carries the carpet element while the free end/ends of the bow is/are attached to the axle.

The meanings of the terms "bow" and "fork" are each not restricted to double sided suspensions attached to the axle on both sides thereof, but are also meant to cover one sided suspensions in the form of connecting elements attached to only one end of the axle.

The bow and the fork are attached to the axle in a way which allows relative rotation of the fork with regard to the bow about the axle in a rotating condition. This allows the handle to be placed in different angles with regard to the carpet element for either pulling the carpet element behind the operating person or for pushing the carpet element in front of the operating person.

Advantageously, a locking mechanism is provided which locks the fork and the bow with respect to each other such that relative rotation between the handle and the carpet element is restricted.

The locking condition allows lifting the carpet probe from the ground surface with less vertical movement of the handle because the carpet does not hang down vertically from the axle as it is rotatably locked to the handle. Having the carpet element locked by the locking mechanism in a more horizontal position also makes it easier to manoeuvre the carpet in the air to replace it properly on the ground or on top of vegetation after lifting the carpet over an obstacle like a fence or a garden wall.

In a first embodiment, the bow is fixedly attached to the axle restricting rotation of the bow with regard to the axle, while the fork is rotatably attached to the axle such that the fork and handle can freely rotate with regard to the axle and the carpet probe. In this embodiment, the locking mechanism is provided to lock the fork and the axle together in the locking condition. The handle is then rotatably fixed to the axle in the locking condition. Rotation of the fork and the handle is then restricted with regard to the axle and bow.

In an alternative embodiment, the fork is fixedly attached to the axle while the bow is rotatably attached to the axle. Relative rotation between the bow/handle and the axle are restricted while relative rotation between the bow and the axle is allowed in the rotating condition. The locking mechanism is then provided to lock the bow and the axle together in the locking condition.

The locking mechanism is preferably adapted to be engaged simply upon lifting the handle. With handle in either pulling or pushing position, depending on the design the carpet probe is then moved by gravity and rotates the axle into the particular locking condition in which the locking mechanism engages. The handle can also be rotated in the correct angle relative to the axis before lifting upon when the locking mechanism will engage without any further rotation. This can be achieved by a pin and hole design. A pin may be attached to each end of the fork or bow, respectively on either side of the wheel, while a respective complementary hole is provided in the axle on either side of the wheel. Of course, this arrangement may also be provided vice versa, i.e. pins on the axle and holes in the fork or the bow. The pins engage within the holes in the locking condition, locking the fork/bow and axle together, while the pins and holes do not engage each other in the rotating condition.

Alternatively, the axle and the fork (or bow, respectively) may be provided with complementary engagement surfaces which engage only in the locking condition, while they do not engage in rotating condition. When locked, the engagement of the flat engaging surfaces restricts relative rotation between the axle and the fork.

For example, the engagement surface on the axle may be achieved through parallel slots which may be cut normal to the axial direction on the outer circumference of the axle. The innermost portion of such channel then forms the flat engagement surface. The engagement surface of the fork or bow only engages the engagement surface on the axle in a particular relative rotational position in which the angle between the two engagement surfaces on the axle and on the fork allows sliding engagement. When the handle is lifted up, a downward gravitational force will act on the wheel and the axle, forcing the wheel and the axle away from the handle. In the respective particular rotational position, the two engagement surfaces on the axle and fork or bow then slide along each other into engagement, restricting relative rotation.

The engagement surface on the fork (or bow) may be part of a yoke (or slot) into which the axle is engaged through gravitational force upon lifting the carpet probe from the ground. Thus, the axle is caught within the yoke/slot in the locking condition, while placing the wheel back onto the ground lifts the axle out of the yoke and out of the locking engagement into the rotational condition, in which the two engagement surfaces do not engage.

The carpet probe may be adapted to be detachable form the axle in order to allow changing of the probe. Likewise, the handle may also be detachable from the axle and/or from the fork. Also, the gas sensor which is preferably attached to the upper end of the handle and carried by the handle, may also be detachable form the handle to allow replacing or exchanging the sensor.

Preferably, the frame element which carries the carpet element is connected to or close to the centre of the carpet element, such as the centre of gravity of the carpet element. This reduces the risk that the carpet element will lift off the ground surface when tensed by dragging friction and pull force from the frame element and the axle.

Preferably, the carpet element is carried by a suspension comprising at least two axis of freedom being orthogonal each other. The frame element may be part of the suspension. This means that the carpet element may rotate about each axis of freedom to allow the carpet element to stay flat on the ground surface even when turning the carpet probe around tight corners.

A first axis of freedom may be parallel to the axle of the wheel. The first axis is then horizontal and normal to the travelling direction of the probe. This allows the handle to be held in different angles relative to the carpet element without exerting lifting forces on the carpet.

A second axis of freedom may be located at the attachment between the carpet element and the frame element. The second axis of freedom is then horizontal and parallel with the traveling direction of the probe. This is particularly advantageous when the frame element is connected to the centre of the carpet element. The second axis of freedom allows the stiff link between the wheel axle and the carpet to rotate with the wheel when it is tipped without exerting rotational forces on the carpet.

A third axis of freedom may also be located at the attachment point between the carpet element and the frame element, which is preferably in the centre (of gravity) of the carpet element. The third axis of freedom is horizontal and normal to the traveling direction, i.e. normal to the second axis of freedom. The third axis of freedom allows the stiff link between the wheel axle and the carpet element to move up and down as the tips of the axis move up and down when turning the wheel without exerting rotational forces on the carpet element.

At least two axis of freedom normal to each other allow the carpet element to stay flat and parallel to the ground even when the wheel axle is tilted from maneuvering the carpet element.

BRIEF DESCRIPTION OF THE DRAWINGS

In the following, embodiments of the invention are described with reference to the figures.

Figure 1:
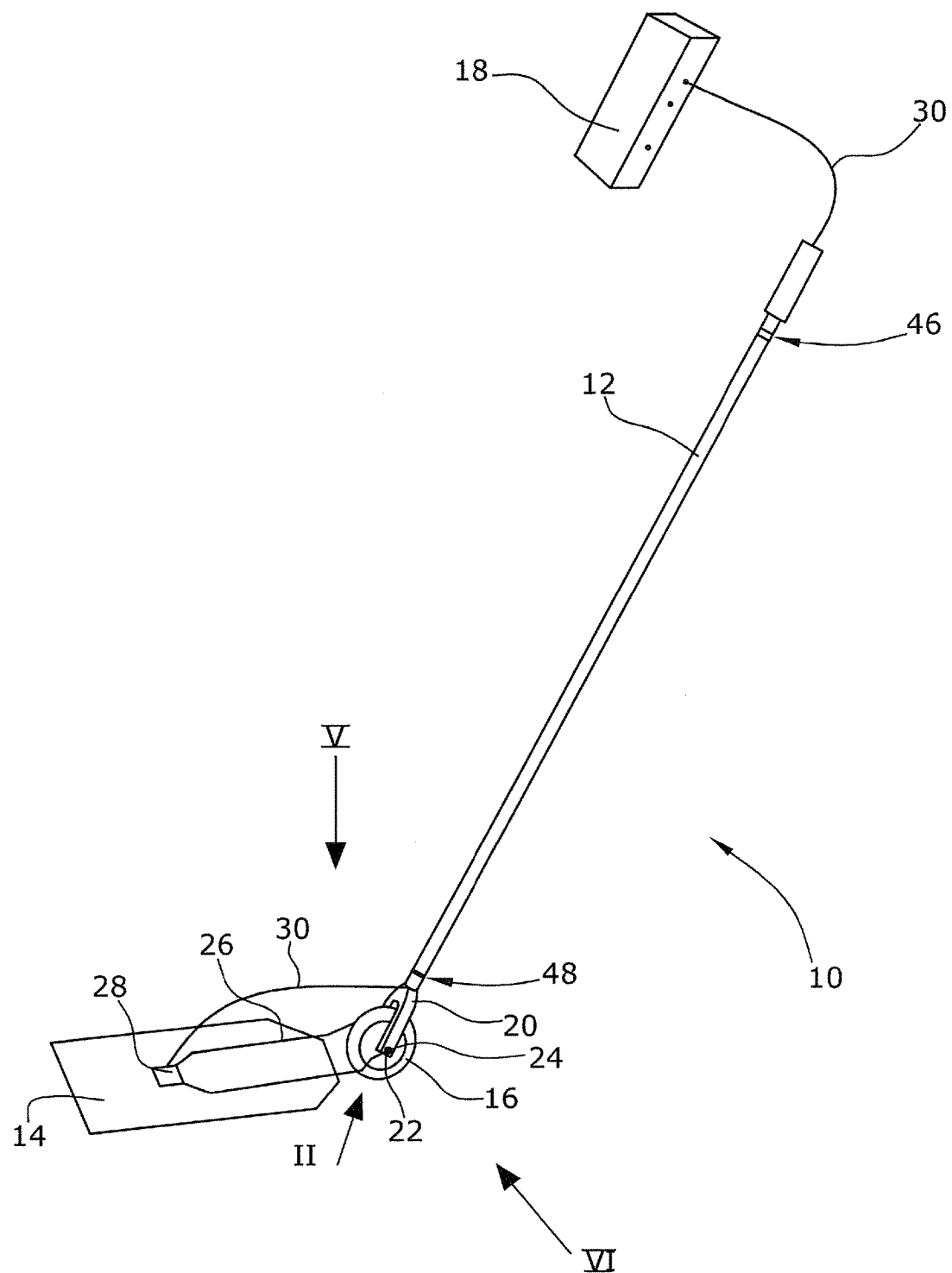
FIG. 1 shows the carpet probe.

One embodiment of the carpet probe 10 is shown in FIG. 1 and comprises a cylindrical longitudinally extending handle 12, a flat carpet element 14, a single wheel 16 and a gas sensor 18 connected to the upper end of the handle 12.

The handle 12 is made of a carbon fibre in order to achieve a stable lightweight design. At its lower end, opposite to the upper end carrying the sensor 18, the handle 12 is connected to a fork 20, comprising to parallel ends 22 for attachment of the wheel 16. An axle 24 carrying the wheel 16 is held by the two ends 22 of the fork 20.

A frame element 26 formed of a metal bow is connected to the axle 24. The frame element 26 is rotatably fixed to the axle 24 such that no relative rotation between the axle 24 and the frame element 26 is possible. The frame element 26 carries the flat carpet element 14 and fixes the carpet element 26 to the axle 24.

In or close to its centre, the carpet element 14 comprises a sniffing inlet 28 in the form of an upwardly tapered funnel connected to the gas sensor 18. Gas which is drawn into the funnel of the inlet 28 is guided to the sensor via a gas tube 30. Thus, the sensor 18 is able to analyse or detect gas which enters the inlet 28.

A locking mechanism 32 rotatably locks the axle 24 and the fork 20 together in a locking condition, thereby preventing relative rotation between the axle 24 and the fork 20. In a rotating condition, the locking mechanism 32 is disengaged and allows relative rotation between the axle 24 and the fork 20. A first embodiment of the locking mechanism 32 is shown in FIG. 2 while a second embodiment of the locking mechanism is shown in FIGS. 3 and 4.

Figure 2:
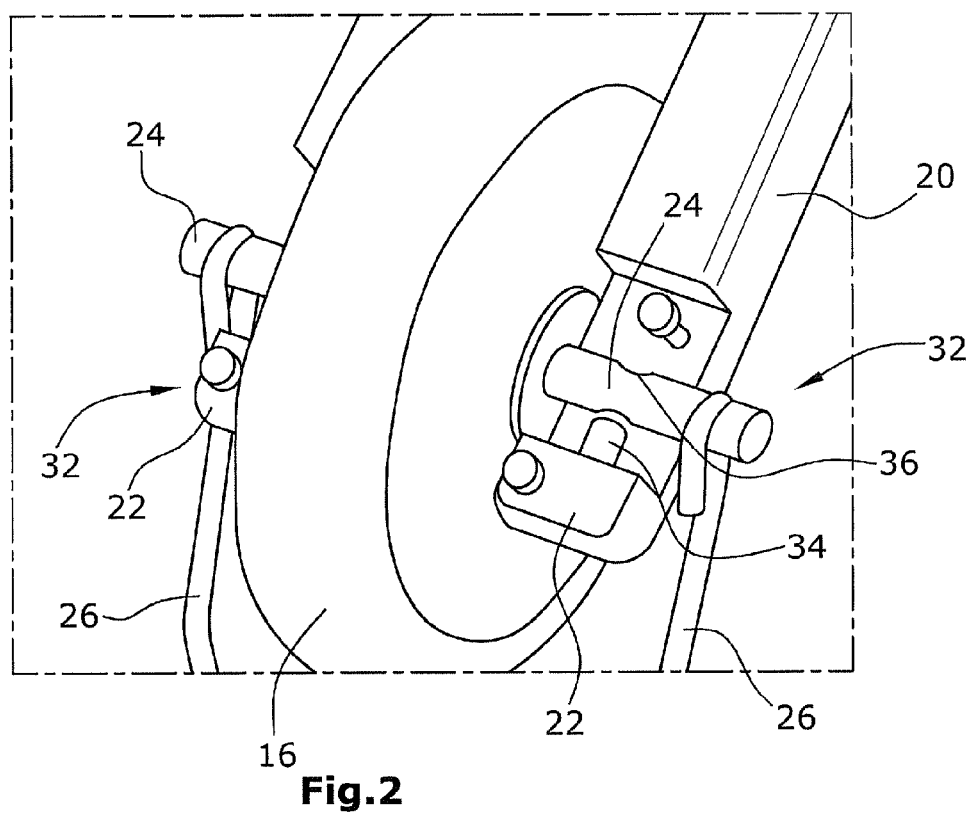
FIG. 2 shows the detail according to arrow II in FIG. 1.
Figures 3, 4:
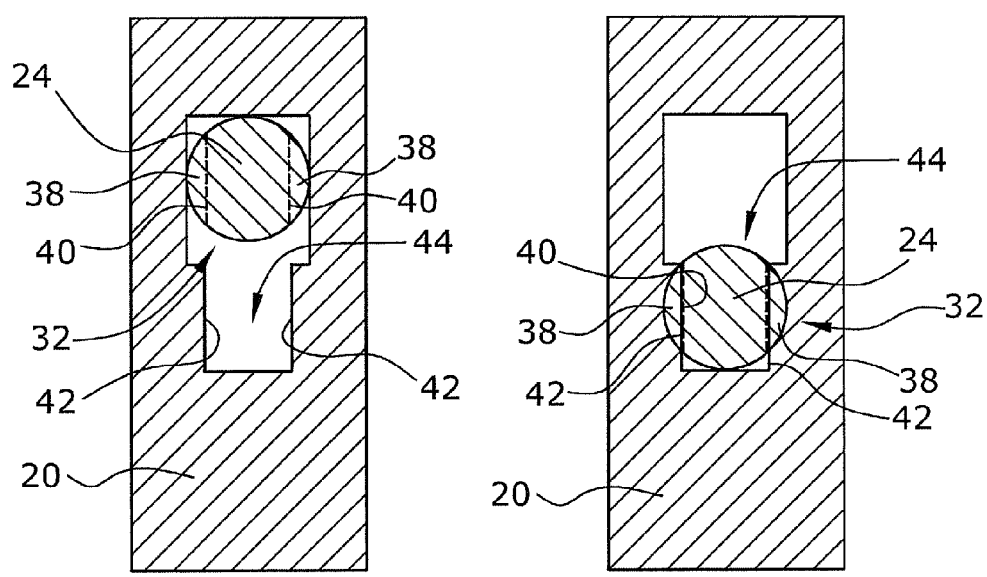
FIG. 3 shows an alternative locking mechanism in the rotating condition.
FIG. 4 shows the locking mechanism of FIG. 3 in the locking condition.

The locking mechanism 32 according the embodiment in FIG. 2 comprises a pin 34 on each end 22 of the fork 20 and a respective hole 36 through the axle 24 on each side of the wheel 16. The two pins 34 engage the two holes 36 in a particular rotational position in which the pins 34 are in alignment with the holes 36.

FIG. 2 shows the locking mechanism 32 in the rotating condition, in which relative rotation between the axle 24 and the fork 20 is allowed. Upwardly pulling on the handle 12 lifts the handle 12 and the fork 20, respectively. When the pins 34 and the holes 36 are in alignment, as shown in FIG. 2, the pins 34 will slide into the holes 36. The locking mechanism 32 is then in the locking condition in which the engagement between the pins 34 and the holes 36 restricts relative rotation between the axle 24 and the fork 20.

In the locking condition, the carpet probe 10 can be lifted up from the ground by moving the handle 12 into a vertically upward direction. The locking engagement restricts relative rotation between the carpet element 14 and the handle 12. This locking engagement prevents that the carpet element 14 falls down by gravitational force and hangs down vertically from the axle 24. Due to the locking engagement, the carpet element 14 rather maintains its sideward horizontal orientation as shown in FIG. 1. The carpet probe 10 does not have to be lifted up as much as it would have to when the carpet element 14 hangs down vertically from the axle 24.

When the wheel 16 is placed onto the ground in the desired position of the carpet probe 10, the pins 34 will disengage from the holes 36 thereby disengaging the locking mechanism such that the carpet probe 10 is again in the rotation condition, in which relative rotation between the carpet element 14 and the handle 12 is allowed. Relative rotation between the handle 12 and the carpet element 14 allows moving the wheel 16 and the carpet element 14 on a ground surface by either pulling or pushing the handle 12. FIG. 1 shows the carpet probe 10 in a condition in which the handle 12 is pulled by an operator, pulling the carpet element 14 over a ground surface. The handle 12 can be easily flipped over in the rotating condition to an angle in which an operator can push the carpet element 14 over a ground surface.

FIG. 3 shows an alternative locking mechanism 32 in a cross sectional view. Instead of the openings 36 of the first embodiment according to FIG. 2, the axle 24 is provided with parallel slots 38 on opposite sides of the axle 24 with regard to the centre of the axle 24. The axle 24 comprises two sets of slots 38 on each side of the wheel 16. The slots 38 are cut normal to the axial direction on the outer circumference of the axle 24. Each slot 38 forms a flat bottom engagement surface 40 which engages with a respective complimentary engagement surface 42 on the fork 20 in the locking condition as shown in FIG. 4.

The flat engagement surfaces 40 are formed by slots 38 in the axle 24. The engagement surfaces 42 are formed on opposing sides of the yoke 44. One yoke is formed at each end 22 of the fork 20.

When the carpet probe 10 is lifted up into the air, the axle 24 is locked to the fork 20 by engagement of the slots 38 with the yoke 44. The engagement surfaces 40 on the axle 24 then slide along the engagement surfaces 42 of the fork 20 and into engagement therewith, as shown in FIG. 4. In this locking condition, engagement of the surfaces 40, 42 restricts relative rotation between the axle 24 and the fork 20.

When the carpet probe 10 is placed back onto the ground, the wheel 16 touches the ground and the axle 24 is lifted up with respect to the fork 20 and out of the yoke 44 into the rotating condition according to FIG. 3. In this rotating condition, the axle 24 is allowed to freely rotate with respect to the fork 20.

A first quick disconnect coupling 46 is provided on the upward end of the handle 12 to allow detachment of the sensor 18 from the handle 12. A second quick disconnect coupling 48 is provided at the lower, opposite end of the handle 12 to allow quick detachment of the fork 20 and wheel 16 from the handle 12. Thereby, the handle 12 can be fitted with a different probe or with a replacement probe.

Figure 5:
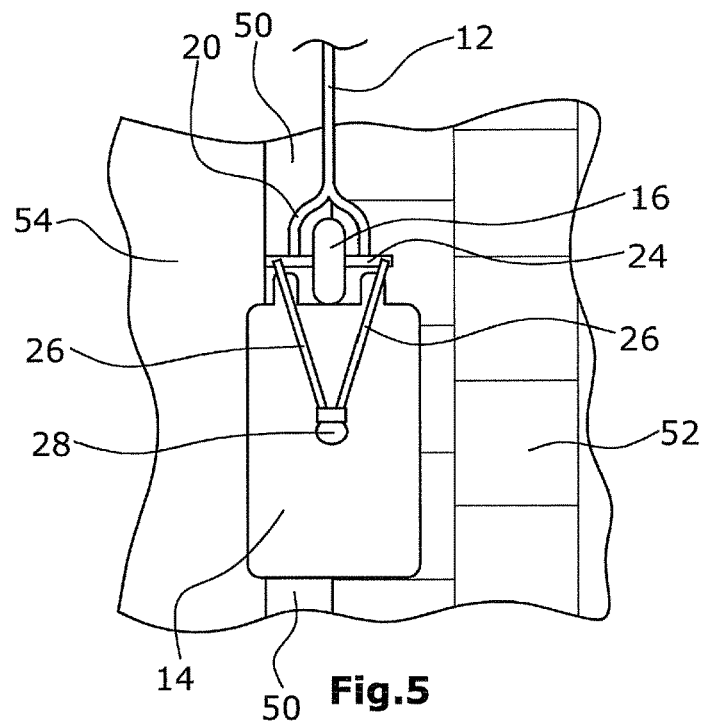
FIG. 5 shows a top view according to arrow V in FIG. 1 during use.

FIG. 5 shows how the carpet probe can easily be operated on a curb stone 50 bordering a sidewalk 52. As the level of the street 54 next to the curb stone 50 is lower than the level of the curb stone 50 and of the sidewalk 52, a conventional multi-wheel carpet probe cannot be operated thereon. Gas emerging from the joint between the curb stone 50 and the sidewalk 52 can often not be detected with conventional multi-wheel carpet probes because the configuration of one wheel on either side of the probe restricts that the sniffing inlet 28 can be placed above the curb stone 50 or above the joint between the curb stone 50 and the sidewalk 52. The single wheel configuration according to the invention, however, makes it possible to run the sniffing inlet 28 right above the curb stone 50 or above the joint between the curb stone 50 and the sidewalk 52. The wheel 16 positioned in the centre of the axle 24 simplifies aiming the sniffing inlet 28 located near the centre of the carpet probe 14 over the desired path.

Figure 6:
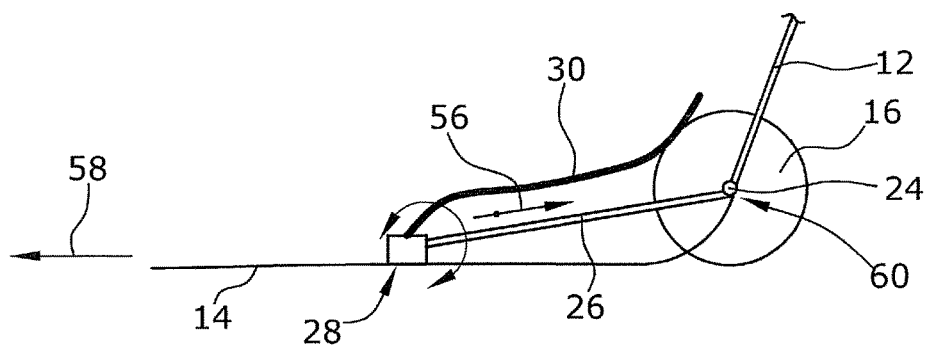
FIG. 6 shows a conceptional side view according to arrow VI in FIG. 1

FIG. 6 shows that the carpet probe is connected to the frame element 26 at the centre of gravity of the carpet probe 14 where the sniffing inlet 28 is located. This results in a pull force in the direction of arrow 56 in FIG. 6 when the carpet probe is moved by an operator. The friction between the carpet element 14 and the ground surface below the carpet element 14 results in a drag force in the direction of arrow 58 in FIG. 6. Accordingly, the drag force is roughly opposite to the direction of the pull force 56 which in turn makes the resultant vertical lifting force on the connection point relatively small. As a result, the flexible carpet element 14 remains on the ground surface in front of the connection point (centre of gravity of carpet element 4) and closer to the ground surface behind.

Conventional prior art carpet elements are directly attached to the axle of the wheels with one edge thereof. As a result, the carpet lifts from the ground when the drag between the carpet element and the ground surface creates a dragging force. The carpet stretches between the axle and the trailing end. This severely limits the carpet's ability to collect gas leaking up through the ground surface as wind and turbulence will blow away much or most of the gas if the carpet is not in resting directly on the ground The invention, on the other hand, provides for a stiff link between the axle 24 and the attachment point at the centre of the carpet element 14 via the frame element 26. The carpet will therefore not be stretched and pulled up because the angle between the direction 56 of the pull force and the direction 58 of the drag force is smaller than in the prior art solutions. It might seem obvious to someone skilled in the art to lower the attachment point below the axis by providing a stiff link under the axle in prior art solutions. This would, however, severely limit the ability of the carpet probe to "climb" over obstacles such as stones etc. The invention solves this by letting the free height under the axle be the full distance from ground to axle and moving the connection point further back so that the wheel can "climb" obstacles and lift up the front edge of the carpet when doing so.

The embodiment according to FIG. 6 comprises a loose attachment of the front edge of the carpet element 14 to the axle 24. This attachment is referenced by arrow 60 in FIG. 6. If the axle 24 is lifted up, for example, when the wheels go up on a curb stone, the attachment 60 in front of the carpet element 14 will lift the carpet element 14 up on large objects such as curb stones.

Figure 7:
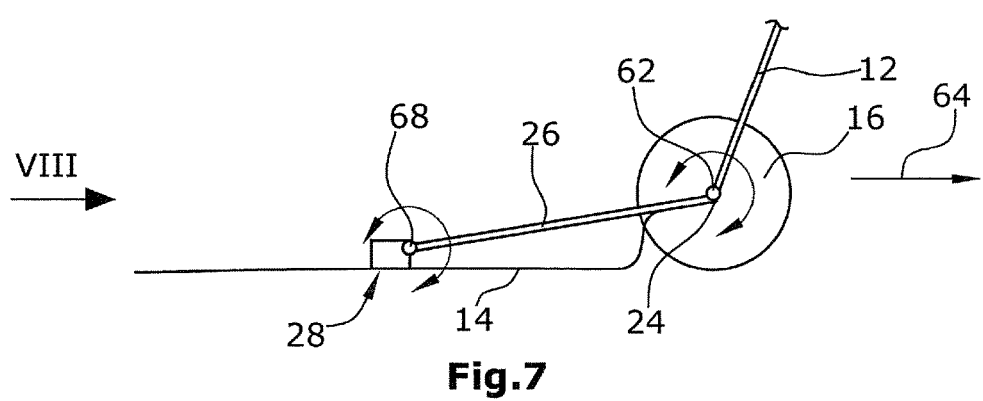
FIG. 7 shows the view of FIG. 6 of a further embodiment and
FIG. 8 shows the view according to arrow VIII in FIG. 7.
Figure 8:
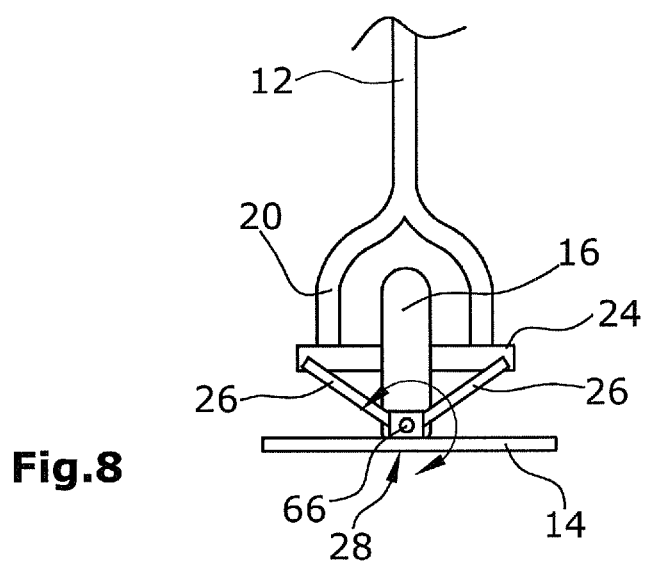

FIGS. 7 and 8 show conceptual views of an embodiment in which the attachment link between the carpet element 14 and the wheel 16 comprises three axis of freedom about which the carpet element 14 may rotate. Again, as in the previous embodiment according to FIG. 6, the frame element 26 is attached to the carpet element 14 in its centre of gravity. A first axis 62 of freedom is parallel to the wheel axle 24, horizontal and normal to the traveling direction (arrow 64 in FIG. 7). The first axis 62 of freedom allows the handle 12 to be held in different angles relative to the carpet element 14 without exerting lifting forces on the carpet element 14.

The second axis 66 of freedom is shown in FIG. 8. The second axis 66 is located at the centre of gravity of the carpet element 14 at the attachment between the frame element 26 and the carpet element 14. The second axis 66 is horizontal and parallel to the traveling direction 64. This allows the stiff link 26 between the axle 24 and the carpet element 14 to rotate with the wheel 16 when it is tipped without exerting rotational forces on the carpet element 14.

The third axis 68 of freedom is also located at the centre of gravity of the carpet element 14 between the frame element 26 and the carpet element 14, as shown in FIG. 7. The third axis is horizontal and normal to the traveling direction 64. The third axis is parallel to the first axis 62 and orthogonal to the second axis 66. The third axis 68 allows the stiff link between the carpet element 14 and the axle 24 to move up and down as the tip of the wheel axle 24 moves up and down when turning the wheel 16 or passing over a raised obstacle without exerting rotational forces on the carpet element 14.

Altogether, the axis of freedom make the carpet element 14 stay flat and parallel to the ground even when the wheel axle 24 is tilted from maneuvering the carpet probe. The second and third axis of freedom 66, 68 allow the carpet element 14 to balance and level automatically due to the attachment at its centre of gravity.

The invention claimed is:

1. A carpet probe for detecting leaks in underground gas pipes, comprising a handle, a wheel connected to the handle, and a flat carpet element connected to the wheel and comprising a sniffing inlet connected to a gas sensor,
wherein the wheel is the only wheel of the carpet probe configured for rolling on a ground surface, and a connection between the carpet element and the wheel comprises at least two axes of freedom being orthogonal to each other.

2. The carpet probe according to claim 1, wherein the wheel is fitted on an axle to which the handle and/or the carpet element are connected.

3. The carpet probe according to claim 2, wherein the handle is connected to the axle via a fork on both sides of the wheel.

4. The carpet probe according to claim 3, wherein the fork is rotatable about the axle in a rotating condition and is configured to be brought into a locking condition in which a locking mechanism is activated to restrict relative rotation between the fork and the axle.

5. The carpet probe according to claim 4, wherein the locking mechanism is configured to restrict relative rotation between the handle and the carpet element in the locking condition.

6. The carpet probe according to claim 4, wherein the locking mechanism is configured to be activated by pulling the handle away from the wheel at a particular rotational position of the handle with regard to the axle.

7. The carpet probe according to claim 4, wherein the locking mechanism comprises a pin on the fork or the frame element, respectively, and a hole in the axle or vice versa.

8. The carpet probe according to claim 4, wherein the locking mechanism comprises a first flat engaging surface on the axle and a second flat engaging surface on the fork or frame element, respectively, wherein the two engaging surfaces do not engage in the rotating condition and are brought into sliding engagement when the locking mechanism is brought into the locking condition.

9. The carpet probe according to claim 3, wherein the fork engages the axle on both sides of the wheel.

10. The carpet probe according to claim 2, wherein the carpet element is flexible and connected to the axle via a frame element carrying the carpet element.

11. The carpet probe according to claim 10, wherein the frame element is a bow connected to the axle on both sides of the wheel.

12. The carpet probe according to claim 10, wherein the frame element is rotatable about the axle in a rotating condition and is configured to be brought into a locking condition in which a locking mechanism is activated to restrict relative rotation between the frame element and the axle.

13. The carpet probe according to claim 12, wherein the locking mechanism is configured to restrict relative rotation between the handle and the carpet element in the locking condition.

14. The carpet probe according to claim 12, wherein the locking mechanism is configured to be activated by pulling the handle away from the wheel at a particular rotational position of the handle with regard to the axle.

15. The carpet probe according to claim 12, wherein the handle is connected to the axle via a fork; and wherein the locking mechanism comprises a pin on the fork or the frame element, respectively, and a hole in the axle or vice versa.

16. The carpet probe according to claim 12, wherein the locking mechanism comprises a first flat engaging surface on the axle and a second flat engaging surface on the fork or frame element, respectively, wherein the two engaging surfaces do not engage in the rotating condition and are brought into sliding engagement when the locking mechanism is brought into the locking condition.

17. The carpet probe according to claim 1, wherein the carpet element and/or the handle are detachable from the wheel and/or wherein the gas sensor is detachably connected to the handle.

18. The carpet probe according to claim 1, wherein the carpet element is connected to a frame element.

* * * * *